(12) United States Patent
Shin

(10) Patent No.: US 11,486,336 B2
(45) Date of Patent: Nov. 1, 2022

(54) PROPULSION DEVICE FOR LIQUID PROPELLANT ROCKET ENGINE

(71) Applicant: PERIGEE AEROSPACE INC., Daejeon (KR)

(72) Inventor: Dong Yoon Shin, Goyang-si (KR)

(73) Assignee: PERIGEE AEROSPACE INC., Daejeon (KR)

( * ) Notice: Subject to any disclaimer, the term of this patent is extended or adjusted under 35 U.S.C. 154(b) by 0 days.

(21) Appl. No.: 17/193,125

(22) Filed: Mar. 5, 2021

(65) Prior Publication Data

US 2021/0190012 A1    Jun. 24, 2021

Related U.S. Application Data

(63) Continuation of application No. PCT/KR2019/011562, filed on Sep. 6, 2019.

(30) Foreign Application Priority Data

Sep. 6, 2018  (KR) .......................... 10-2018-0106587

(51) Int. Cl.
*F02K 9/52* (2006.01)
*F02K 9/58* (2006.01)
(Continued)

(52) U.S. Cl.
CPC ............ *F02K 9/52* (2013.01); *F02K 9/58* (2013.01); *F02K 9/95* (2013.01); *F23R 3/00* (2013.01); *F23R 2900/00009* (2013.01)

(58) Field of Classification Search
CPC ..... F02K 9/44; F02K 9/52; F02K 9/95; F23R 3/343; F23R 2900/00009
See application file for complete search history.

(56) References Cited

U.S. PATENT DOCUMENTS 3,056,257 A * 10/1962 Brunkhardt ............... F02K 9/95
                                                   60/39.825
3,533,233 A * 10/1970 Fiedler .................... F23Q 7/001
                                                   60/39.821
(Continued)

FOREIGN PATENT DOCUMENTS

JP          2005-061385 A      3/2005
KR    10-2000-0048063 A       7/2000
(Continued)

OTHER PUBLICATIONS

KR Office Action dated Jan. 26, 2021 as received in Application No. 10-2019-0110911.
(Continued)

*Primary Examiner* — Todd E Manahan
*Assistant Examiner* — Kyle Robert Thomas
(74) *Attorney, Agent, or Firm* — Maschoff Brennan

(57) ABSTRACT

According to one embodiment, there is provided a propulsion apparatus of liquid propellant rocket engine. The propulsion apparatus of liquid propellant rocket engine, the propulsion apparatus including: a body in which liquid propellant flows; an injector core located inside the body; at least one outlet connected to the injector core to discharge combustion gas; and an injector for discharging the liquid propellant flowing into the body, wherein the injector is located in an area adjacent to the outlet, wherein the liquid propellant moves between a frame of the body and a frame of the injector core.

6 Claims, 5 Drawing Sheets

(51) Int. Cl.
*F02K 9/95* (2006.01)
*F23R 3/00* (2006.01)

(56) References Cited

U.S. PATENT DOCUMENTS

| | | | | |
|---|---|---|---|---|
| 4,894,986 A * | 1/1990 | Etheridge | ................. | F02K 9/52 |
| | | | | 60/258 |
| 5,768,885 A | 6/1998 | Johnson et al. | | |
| 6,469,424 B1 | 10/2002 | Marable | | |
| 6,918,243 B2 * | 7/2005 | Fisher | ...................... | F02K 9/42 |
| | | | | 60/211 |
| 10,018,361 B2 | 7/2018 | Seol | | |
| 2004/0068979 A1* | 4/2004 | Kline | ........................ | C06C 9/00 |
| | | | | 60/256 |
| 2006/0201134 A1* | 9/2006 | Eidelman | ................. | B64G 1/40 |
| | | | | 60/204 |
| 2008/0264372 A1* | 10/2008 | Sisk | ......................... | F02K 9/42 |
| | | | | 123/144 |
| 2010/0107601 A1 | 5/2010 | Valentian | | |
| 2018/0112628 A1 | 4/2018 | Anflo | | |

FOREIGN PATENT DOCUMENTS

| | | |
|---|---|---|
| KR | 10-1187592 B1 | 10/2012 |
| KR | 10-1631891 B1 | 6/2016 |
| KR | 10-1738946 B1 | 5/2017 |
| KR | 10-2018-0022328 A | 3/2018 |

OTHER PUBLICATIONS

KR Office Action dated Nov. 18, 2020 as received in Application No. 10-2019-0110911.
KR Office Action dated Aug. 3, 2020 as received in Application No. 10-2019-0110911.
International Search Report dated Dec. 12, 2019 as received in Application No. PCT/KR2019/011562.
Written Opinion dated Dec. 12, 2019 as received in Application No. PCT/KR2019/011562.
KR Notice of Allowance in Application No. 10-2019-0110911 dated Aug. 3, 2021.

* cited by examiner

Prior Art

PROPULSION DEVICE FOR LIQUID PROPELLANT ROCKET ENGINE

TECHNICAL FIELD

The present invention relates to a propulsion device for a liquid propellant rocket engine using an electric ignition method. More particularly, the present invention relates to a propulsion device for a liquid propellant rocket engine into which an oxidizing agent and a fuel stored in a liquid phase are injected to perform combustion.

BACKGROUND ART

Jet propulsion engines used as major propulsion engines for rocket apparatuses are classified into hypergolic propellants and non-hypergolic propellants according to characteristics of propellants used. The hypergolic propellants are immediately ignited when an oxidizing agent and a fuel in a liquid or gas state come into contact therewith and thus can be stored at room temperature and ignited easily. However, toxicity and explosion risk are present.

In the case of the non-hypergolic propellants, hypergolic substances such as triethlaluminum (TEAL) or triethylborane (TEB) having toxicity are used for ignition.

To solve this problem, research on a propulsion device of a liquid propellant rocket engine using an electric ignition method is in progress.

DISCLOSURE

Technical Problem

An aspect of the present invention is to increase the ignition efficiency by providing a sufficient amount of heat to the entire combustion device by generating a flame in the entire combustion device.

Another aspect of the present invention is to reduce the mass of an engine and reduce the operational reliability burden by eliminating the supply of an additional propellant for ignition.

Still another aspect of the present invention is to increase the stability of the engine and reduce the mass thereof by providing a sealless structure that can withstand high temperature and high pressure.

Yet another aspect of the present invention is to reduce vibrations, which are the cause of low-frequency combustion instability, by reducing residual propellant during ignition.

Yet another aspect of the present invention is to prevent a hard start phenomenon in which the residual propellant is combusted all at once before the combustion device performs ignition and reaches a steady combustion stage and a pressure exceeding a design pressure range is applied by allowing initial ignition of the propellant to occur in all area of the combustion device.

Yet another aspect of the present invention is to reduce the number of components by manufacturing a propellant injector and an igniter in a single coaxial shape and to reduce a manufacturing time and cost by providing a simple structure that does not require complicated manufacturing processes such as welding.

Yet another aspect of the present invention is to improve the reliability against an ignition phenomenon when an injector performs an initial operation.

Yet another aspect of the present invention is to prevent high-frequency pressure instability due to pressure fluctuations when an engine starts up by reducing the activation energy of the propellant.

Yet another aspect of the present invention is to apply the same design to rocket engines having various thrusts and sizes only using one injector in the center.

The problem to be solved by the present invention is not limited to the above-described problems, and problems which are not described will be clearly understood by those skilled in the art to which the present invention pertains from the present specification and the accompanying drawings.

Technical Solution

According to one embodiment, there is provided a propulsion apparatus of liquid propellant rocket engine. The propulsion apparatus of liquid propellant rocket engine, the propulsion apparatus including: a body in which liquid propellant flows; an injector core located inside the body; at least one outlet connected to the injector core to discharge combustion gas; and an injector for discharging the liquid propellant flowing into the body, wherein the injector is located in an area adjacent to the outlet, wherein the liquid propellant moves between a frame of the body and a frame of the injector core.

The solution of the problem of the present invention is not limited to the above-described solutions, and solutions which are not described will be clearly understood by those skilled in the art to which the present invention pertains from the present specification and the accompanying drawings.

Advantageous Effects

According to an embodiment, the ignition efficiency can be increased by providing a sufficient amount of heat to the entire combustion device by generating a flame in the entire combustion device.

According to another embodiment, the mass of an engine can be reduced and the operational reliability burden can be reduced by removing a separate ignition agent system for ignition.

According to still another embodiment, the stability of the engine can be increased and the mass thereof can be reduced by providing a sealless structure that can withstand a high temperature and a high pressure.

According to yet another embodiment, vibrations, which are the cause of low-frequency combustion instability, can be reduced by reducing residual propellant.

According to yet another embodiment, a hard start phenomenon can be prevented in which the residual propellant is combusted all at once before the combustion device performs ignition and reaches a steady combustion stage and a pressure exceeding a design pressure range is applied by allowing initial ignition of the propellant to occur in all area of the combustion device.

According to yet another embodiment, the number of components can be reduced by manufacturing a propellant injector and an igniter in a single coaxial shape, and a manufacturing time and cost can be reduced by providing a simple structure that does not require complicated manufacturing processes such as welding.

According to yet another embodiment, the reliability against an ignition phenomenon can be improved when an injector performs an initial operation.

According to yet another embodiment, high-frequency pressure instability due to pressure fluctuations when an engine starts up can be prevented by reducing the activation energy of the propellant.

According to yet another embodiment, the same design can be applied to rocket engines having various thrusts and sizes only using one injector in the center.

The effect of the present invention is not limited to the above-described effects, and effects which are not described will be clearly understood by those skilled in the art to which the present invention pertains from the present specification and the accompanying drawings.

MODES OF THE INVENTION

Figure 1:
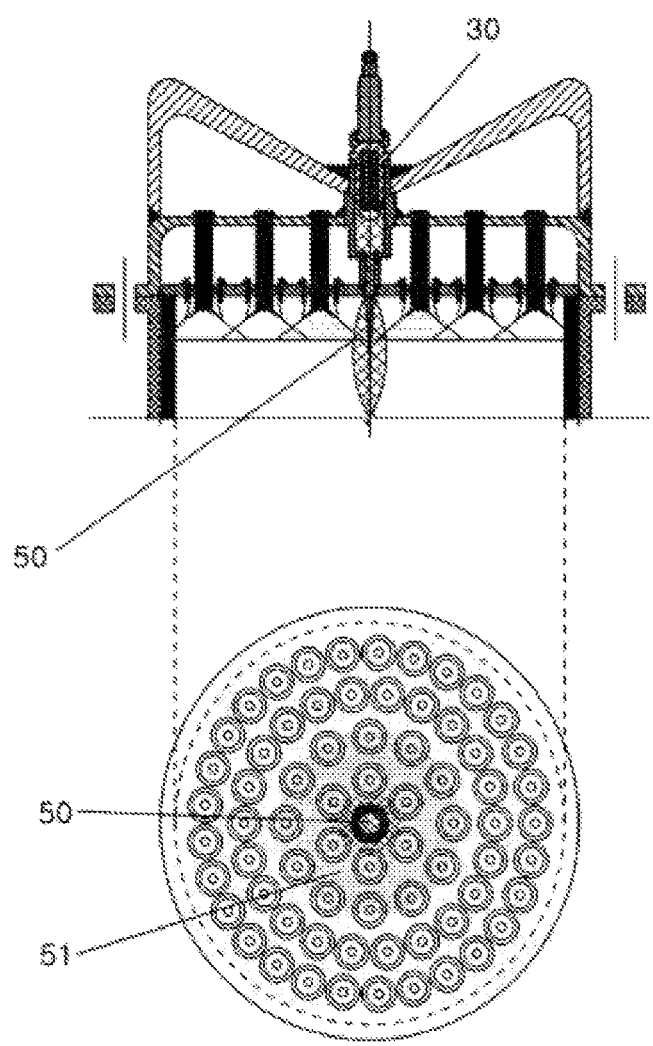
FIG. 1 is a view illustrating a propulsion device according to the related art.

Hereinafter, detailed embodiments of the present invention will be described in detail with reference to the accompanying drawings. However, the spirit of the present invention is not limited to the presented embodiments, and those skilled in the art who understand the spirit of the present invention may easily propose other regressive inventions or other embodiments included in the scope of the present invention through addition, change, deletion, and the like of other components within the same scope of the spirit. However, these embodiments are also included in the scope of the present invention.

Further, components having the same function within the same scope of the spirit illustrated in the drawings of each embodiment will be described using the same reference numerals.

The terms used herein have been selected as general terms that are currently widely used in consideration of functions in the present invention but may be changed according to the intention, the custom, the emergence of new technologies or the like of those skilled in the art to which the present invention belongs. However, unlike this, when a specific term is defined and used as a predetermined meaning, the meaning of the term will be separately described. Thus, the terms used herein should be interpreted on the basis of an actual meaning of the terms and the entire contents of the present specification, not a simple name of the term.

FIG. 1 is a view illustrating a propulsion device according to the related art.

Referring to FIG. 1, a propulsion device 100 according to the related art uses a propulsion device 100 in which one igniter 30 and a mixing head 21 are coupled. Herein, the mixing head 21 is a device to which a plurality of injectors 20 are coupled to discharge a propellant.

In this case, since the igniter 30 and the injector 20 are different components, the igniter 30 should be coupled to a side surface of the mixing head 21 or a main combustion chamber 200 through a separate fastening part. Since the main combustion chamber 200 is operated at a high temperature of 2,500 K and a high pressure of 200 bar, sealing that may withstand the high temperature and the high pressure is required.

Additionally, in this case, the igniter 30 cannot evenly apply a sufficient amount of heat to the entire main combustion chamber 200 because a flame 50 occurs at a specific point in the main combustion chamber 200. Further, only a part of a propellant liquid film 51 comes into direct contact with the flame. Accordingly, the igniter 30 has a problem in that more propellant than the absolute amount of required heat should be consumed.

Figure 2:
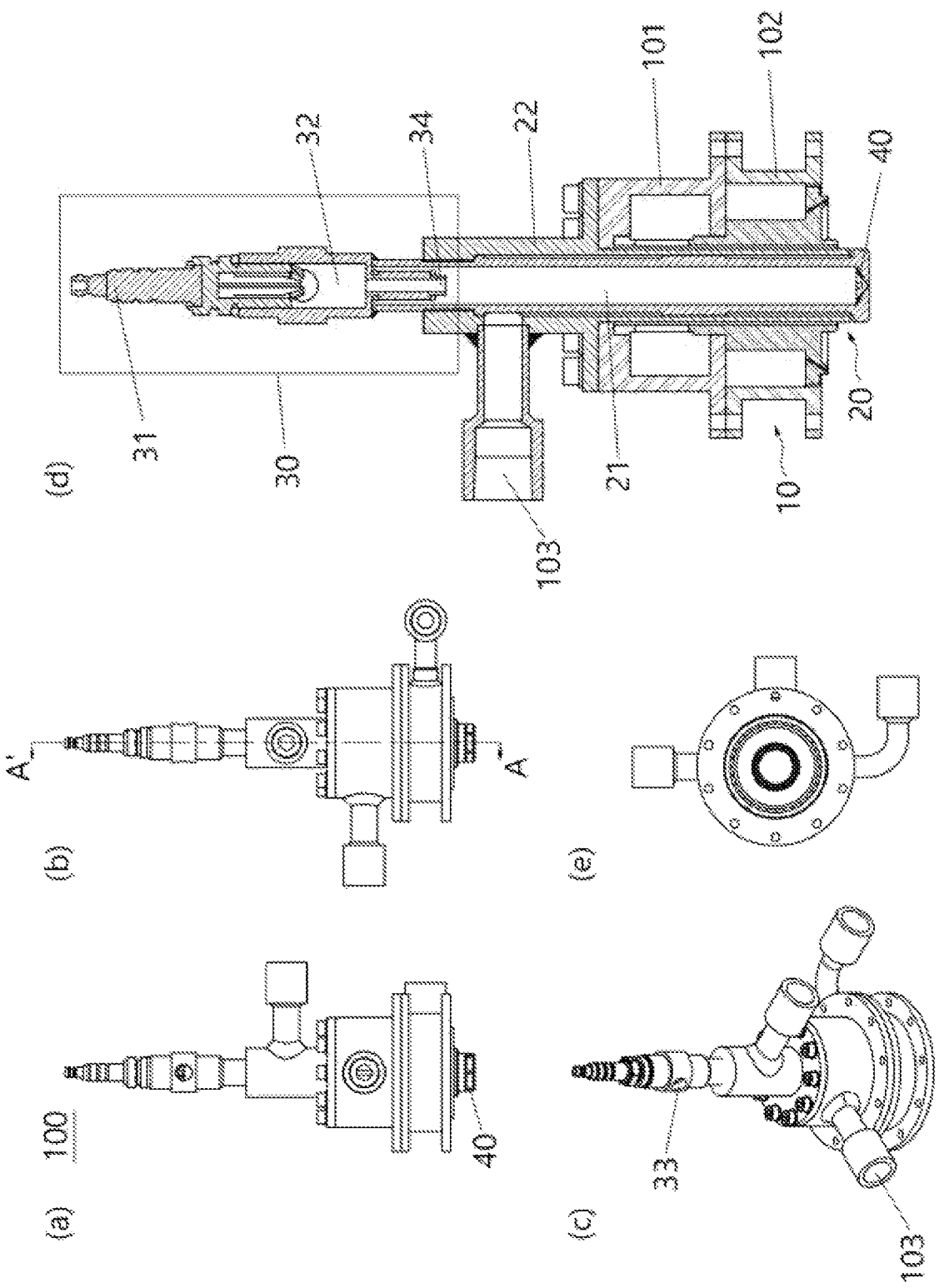
FIG. 2 is a view illustrating a propulsion device according to an embodiment of the present invention.

FIG. 2 is a view for describing a propulsion device according to an embodiment. In more detail, FIG. 2A is a front view of a propellant injection and combustor ignition device. In this case, FIG. 2B is a side view, and FIG. 2C is a perspective view. FIG. 2D is a cross-sectional view taken along line A-A of FIG. 2A1. FIG. 2E is a view of the propellant injection and combustor ignition device when viewed from bottom.

Referring to FIG. 2, the propulsion device 100 may include a body 10, an injector 20, an igniter 30, and a discharge port 40. The body 10 may include a liquid propellant injection dome 101, a liquid propellant injection plate 102, a propellant manifold 103, and an injector inner sleeve 22, and the injector 20 may include an injector core 21.

The igniter 30 may include an igniter spark plug 31, a secondary combustion chamber 32, a propellant inlet 33, and a combustion gas exhaust port 34. According to the embodiment, the igniter spark plug 31 may be fastened to a location adjacent to the propellant inlet 33. According to the embodiment, the igniter spark plug 31 may be fastened to one end of the igniter 30, and the combustion gas exhaust port 34 may be fastened to the other end of the igniter 30.

The combustion gas exhaust port 34 may be fastened to one end (inlet portion) of the injector core 21. According to the embodiment, the injector core 21 may have a cylindrical shape. In this case, combustion gas may be injected in a first direction that is the same direction as that of a first axis that is an axis of the injector core 21.

The discharge port 40 may be fastened to the injector inner sleeve 22 and may be located at the other end (outlet portion) of the injector core 21 in a circumferential direction XY of the injector core 21. In this case, the discharge port 40 is formed to extend along a second axis, and the first axis and the second axis are different from each other. According to the embodiment, the first axis and the second axis are perpendicular to each other.

The first axis and the second axis may have an angle. The first axis and the second axis may have an acute angle. For example, the discharge port 40 may be formed to have an inclination with respect to the injector core 21. That is, the distance between the first axis and the discharge port 40 may increase in a direction away from the igniter 30 along the first axis.

The discharge port 40 may be one discharge port having an annular structure or may be a plurality of discharge ports having a pipe shape. When the plurality of discharge ports 40 are present, an outlet portion of the discharge ports 40 may have a smaller cross-sectional area than an inlet portion thereof.

The injector core 21 may be shaped to be widened in a second direction that is the circumferential direction XY from the cylindrical other end (outlet portion). The second direction may be a direction along the second axis.

As the injector core 21 is widened, the injector inner sleeve 22 may be shaped to be expanded from the other end of the injector inner sleeve 22 while maintaining a gap in accordance with the expanded shape of the injector core 21.

A liquid propellant may be discharged by moving between a frame of the body 10 and a frame of the injector core 21. According to the embodiment, the liquid propellant may be discharged by moving between the inner surface of the injector inner sleeve 22 and the outer surface of the injector core 21 included in the body 10.

The liquid propellant injection dome 101 may include a propellant manifold 103. According to the embodiment, the propellant manifold 103 may have an annular shape.

The liquid propellant injection dome 101 may be connected to the injector inner sleeve 22 in a direction toward the igniter 30 and may be connected to the outer liquid propellant injection plate 102 in a direction toward a main combustor.

The outer liquid propellant injection plate 102 may be fastened to the main combustion chamber 200. The liquid propellant may be introduced into the outer liquid propellant injection plate 102.

In this case, the injector 20 and the igniter 30 are formed to extend in the same axial direction as the first axis of the injector core 101. That is, the liquid propellant discharged from the injector 20 is ignited in the igniter 30 and discharged in a form that shares the same axis as the flame 50 discharged through the combustion gas exhaust port 34. Since the discharge port 40 is disposed coaxially with the igniter 30, the liquid propellant discharged from the injector 20 shares the same axis as the flame 50 discharged from the discharge port 40 and forms the propellant liquid film 83.

Figure 3:
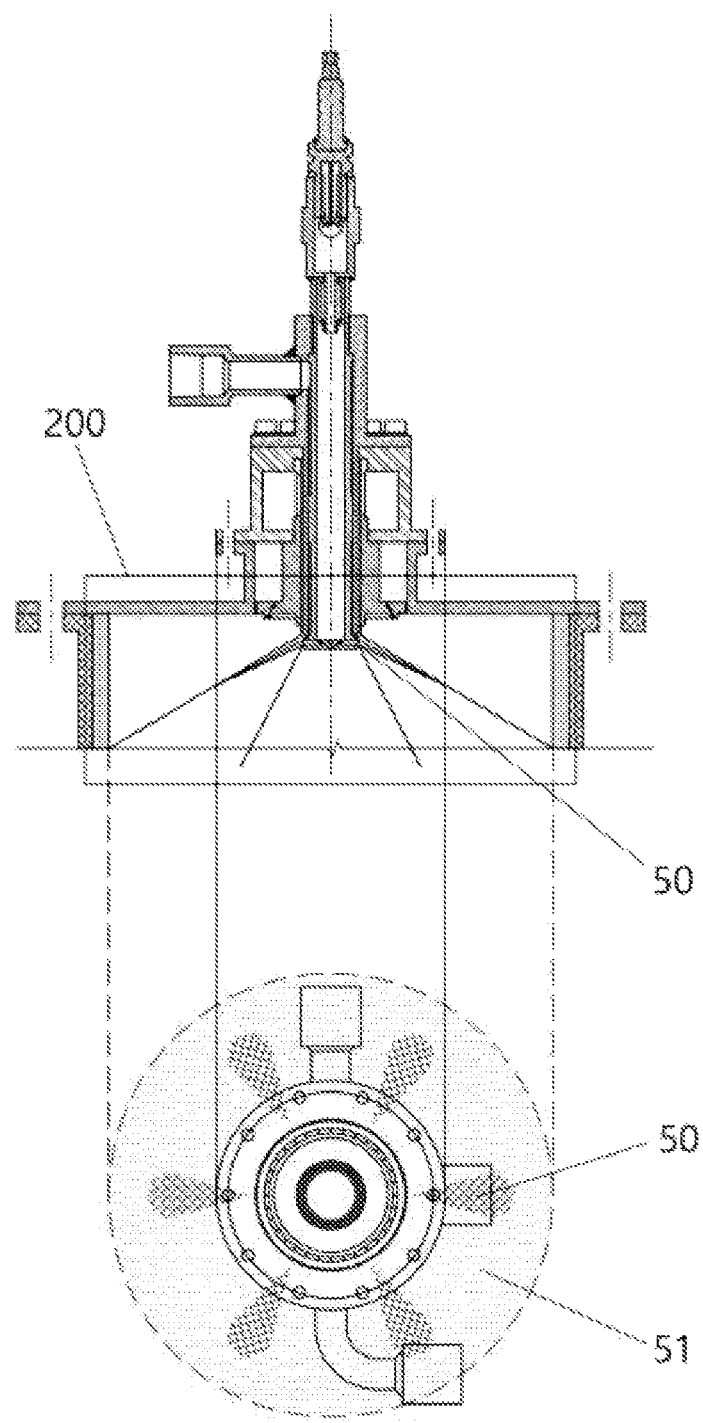
FIG. 3 is a view illustrating a propulsion device according to another embodiment of the present invention.

FIG. 3 is a view illustrating a propulsion device according to another embodiment of the present invention.

Referring to FIG. 3, the propulsion device 100 discharges the flame 50 through at least one discharge port 40 and forms the propellant liquid film 51 by injecting the propellant through the injector 20.

Referring to FIG. 2D and FIG. 3, the combustion gas is ignited in the igniter spark plug 31 of the igniter 30, and accordingly, the flame 50 is generated. The generated flame 50 moves in the first direction through the inside of the injector core 21, moves in the second direction through the inside of the discharge port 40 connected to the injector core 21, and is thus emitted/extruded to the main combustion chamber 200.

The liquid propellant is spouted to the main combustion chamber 200 by moving between the frame of the body 10 and the frame of the injector core 21. In this case, the liquid propellant is discharged to the main combustion chamber 200 through the outer surface of the injector core 21 and the injector inner sleeve 22 included in the body 10.

The liquid propellant may be introduced into the body 10 through the liquid propellant injection dome 101, the liquid propellant injection plate 102, and the propellant manifold 103. In this case, the liquid propellant injection dome 101 may be coupled to the injector inner sleeve 22 in the direction toward the igniter 30 and may be coupled to the outer liquid propellant injection plate 102 in a direction toward the main combustion chamber 200. Further, the liquid propellant injection dome 101 may include a propellant manifold 103.

Referring to FIG. 3, as compared to FIG. 1 that is the related art, the shapes of the flame 50 and the propellant liquid film 51 having a large area are illustrated in the main combustion chamber 9. In this case, initial ignition of the propellant may occur simultaneously in all areas of the main combustion chamber 200. Therefore, since there is no excess residual propellant that the frame 50 of the igniter 30 does not reach, a hard-start phenomenon, in which the internal pressure immediately after the ignition exceeds a design pressure range, can be prevented.

The flame 50 is ejected into the main combustion chamber 9 before the liquid propellant is ejected, and thus ignition may occur simultaneously with ejection of the liquid propellant, thereby preventing a hard start phenomenon.

The plurality of discharge ports 40 may be provided to discharge the combustion gas to the main combustion chamber 9. In this case, six discharge ports 40 are used in FIG. 3, but the number of discharge ports 40 may change depending on the output and the size of a rocket engine. In this case, the combustion gas discharged from the discharge ports 40 may be the flame 50.

Further, the combustion gas may be discharged from the discharge ports 40 to move in a third direction. The third direction may be different from the first direction and the second direction.

The liquid propellant discharged from the injector 20 may move in a fourth direction. The fourth direction may be different from the first direction and the second direction.

The third and fourth directions are the same, and thus a mixing amount of the combustion gas and the liquid propellant 50 may be increased. The combustion gas and the liquid propellant may be discharged in the third and fourth directions while maintaining the angular difference so as to increase the mixing amount due to turbulent flow.

Figure 4:
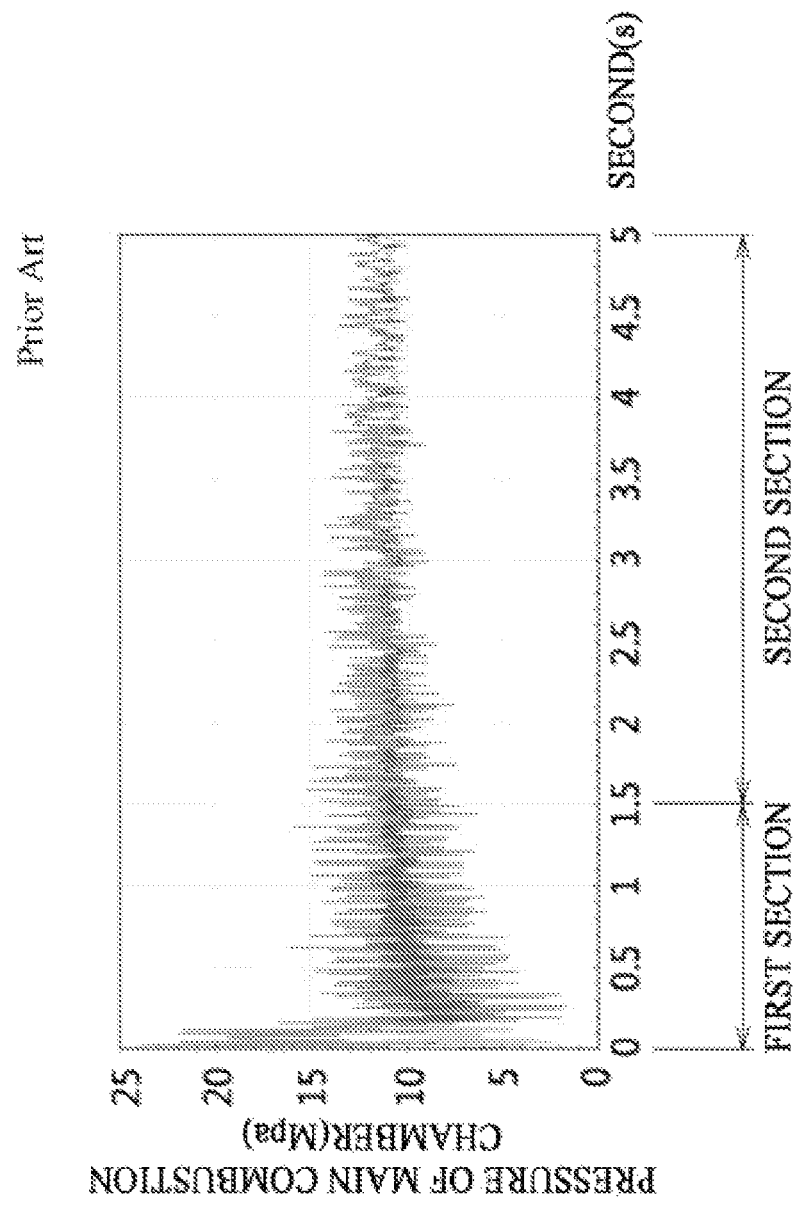
FIG. 4 is a view illustrating a pressure change according to a time in an initial ignition sequence inside a main combustion chamber of the propulsion device of FIG. 1.
Figure 5:
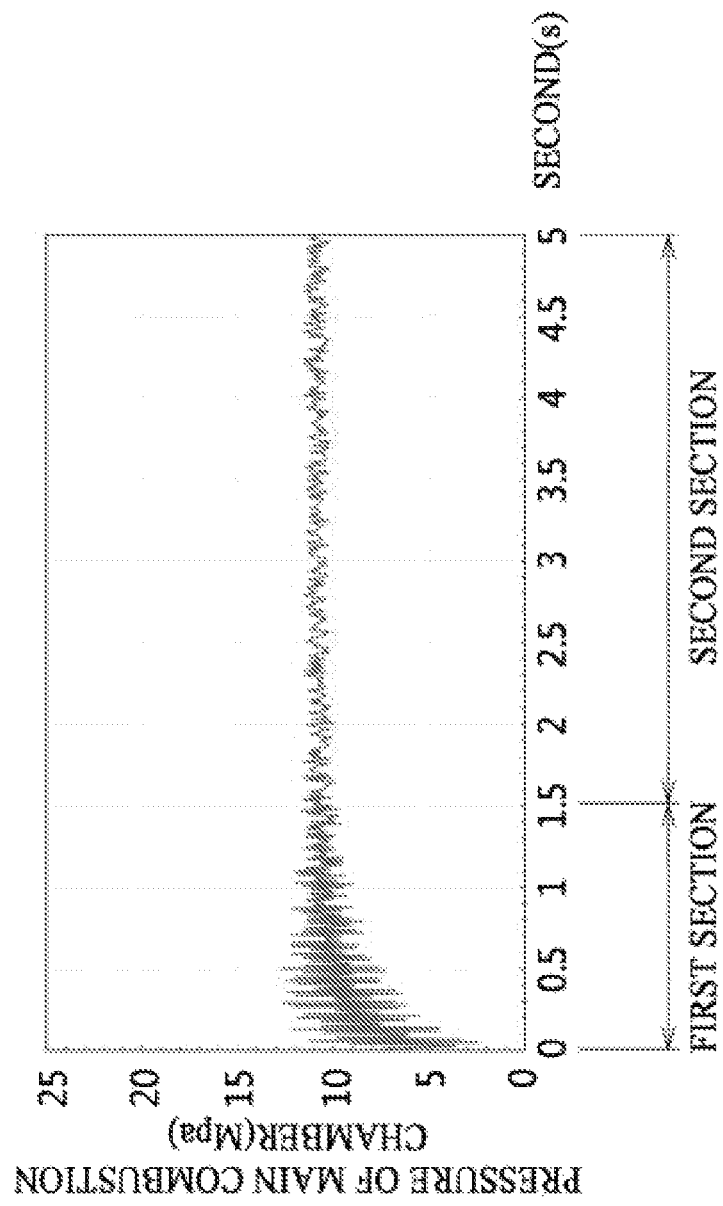
FIG. 5 is a view illustrating a pressure change according to a time in an initial ignition sequence inside a main combustion chamber of the propulsion device of FIG. 3.

FIG. 4 is a view illustrating a pressure change according to a time in an initial ignition sequence inside a main combustion chamber of the propulsion device of FIG. 1, and FIG. 5 is a view illustrating a pressure change according to a time in an initial ignition sequence inside a main combustion chamber of the propulsion device of FIG. 3.

The pressure change according to the time in the initial ignition sequence inside the main combustion chamber of the propulsion device according to the related art of FIG. 4 may include a first section and a second section.

The first section may be defined as a transient section, and the second section may be defined as a steady section. The first section may be a section in which the pressure inside the main combustion chamber is not stabilized, and the second section may be a section in which the pressure inside the main combustion chamber is stabilized.

The first section includes a hard start section in which the pressure is sharply increased. That is, when the flame occurs in the igniter, a rapid pressure increase occurs for about 0.2 seconds.

In the propulsion device according to the related art, since the propellant is injected into the main combustion chamber and is then combusted after a certain period of time, the injected propellant may be combusted at once, thereby causing the hard-start phenomenon.

Referring to FIG. 5, the pressure change according to the time in the initial ignition sequence inside the main combustion chamber of the propulsion device according to the embodiment may include a first section and a second section.

The propulsion device according to the embodiment has the first section shorter than the first section of the propulsion device according to the related art. Since the propulsion device according to the embodiment has the first section shorter than the first section of the propulsion device according to the related art, the pressure may reach the steady section within a short time after ignition.

Further, there is no hard start phenomenon occurring in the propulsion device according to the related art. In the propulsion device according to the embodiment, since the flame immediately collides with the propellant injected in a radial direction, the hard start phenomenon can be prevented, and a propulsion device having a stable output can be implemented therethrough.

The propulsion device according to the embodiment may have an excess pressure deviation of 30% or less. The excess pressure deviation may be defined as a deviation between pressures exceeding an average value based on the average value of the pressure in the second section.

In the propulsion device, the amplitude of the pressure in the first section is larger than that of the second section, and thus a value obtained by dividing the difference between the maximum value of the pressure in the first section and the average value of the pressure in the second section by the average value of the pressure may be defined as the excess pressure deviation.

Since the propulsion device according to the embodiment has the excess pressure deviation of 30% or less, a time during which the pressure inside the main combustion chamber reaches a steady state is shortened, and thus a stable output can be provided. Heretofore, the configuration and features of the present invention have been described based on the embodiments of the present invention, but the present invention is not limited thereto, and it is apparent to those skilled in the art to which the present invention pertains that various changes or modifications can be made within the spirit and scope of the present invention. Thus, it is noted that the changes or modifications belong to the appended claims.

The invention claimed is:

1. A propulsion apparatus of liquid propellant rocket engine, the propulsion apparatus including:
   a body in which liquid propellant flows; and
   an injector inserted into a frame of the body;
   wherein the injector includes a frame of the injector and an injector core is defined by an interior of the frame of the injector,
   wherein the injector core is formed along a first axis,
   wherein the body includes an igniter coaxially connected to the injector core,
   wherein the igniter includes an ignition propellant inlet through which the ignition liquid propellant is introduced, an igniter spark plug that ignites the ignition liquid propellant, a secondary combustion chamber that is a space in which a flame is generated due to the ignition of the ignition liquid propellant, and an exhaust port through which the flame is ejected,
   wherein the injector includes a plurality of outlets connected to the injector core for discharging the flame,
   wherein the plurality of outlets are formed along a second axis orthogonal to the first axis, and include at least a first outlet and a second outlet for discharging the flame in different directions on the second axis,
   wherein the liquid propellant moves between the frame of the body and the frame of the injector and is discharged into a main combustion chamber in an area adjacent to the plurality of outlets,
   wherein the ignition liquid propellant introduced through the ignition propellant inlet is ignited by the igniter spark plug,
   wherein the flame generated in the secondary combustion chamber due to the ignition is ejected to the injector core through the exhaust port, and
   wherein the flame ejected to the injector core is discharged through the plurality of outlets connected to the injector core,
   wherein the flame is ignited by reacting with the liquid propellant in the main combustion chamber,
   wherein the body includes an injector inner sleeve,
   wherein the injector core extends in the circumferential direction as the injector core approaches the plurality of outlets, and
   wherein the injector inner sleeve is expanded based on an expanded shape of the injector core.

2. The propulsion apparatus according to claim 1,
   wherein the flame is discharged to outside of the secondary combustion chamber by moving along a first direction inside the injector core, and moving along a second direction inside the plurality of outlets,
   wherein the first direction is a direction different from the second direction.

3. The propulsion apparatus according to claim 2,
   wherein the flame moves along a third direction inside the main combustion chamber after the flame is discharged from the plurality of outlets,
   wherein the third direction is a direction different from the first direction and the second direction.

4. The propulsion apparatus according to claim 2,
   wherein the liquid propellant is discharged into the main combustion chamber along a fourth direction after moving between the frame of the body and the frame of the injector,
   wherein the fourth direction is a direction different from the first direction being along the first axis and the second direction being along the second axis.

5. The propulsion apparatus according to claim 1,
   wherein the plurality of outlets are located in the circumferential direction of the injector core at an end of the injector core.

6. The propulsion apparatus according to claim 3,
   wherein the internal pressure of the main combustion chamber has an excess pressure deviation of 30% or less.

* * * * *